(12) United States Patent
Williams et al.

(10) Patent No.: US 7,424,228 B1
(45) Date of Patent: Sep. 9, 2008

(54) HIGH DYNAMIC RANGE RADIO FREQUENCY TO OPTICAL LINK

(75) Inventors: Wilber Andrew Williams, Acworth, GA (US); Michael Gregory Abernathy, Ellijay, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 824 days.

(21) Appl. No.: 10/403,467

(22) Filed: Mar. 31, 2003

(51) Int. Cl.
*H04B 10/04* (2006.01)

(52) U.S. Cl. .................. 398/182; 398/183; 398/185; 398/186; 398/187; 398/192; 398/193; 398/194; 398/195; 398/196; 398/197; 398/198; 398/200; 398/202; 398/208; 398/209; 398/214; 398/115; 398/128; 398/130; 398/135; 398/141; 398/158; 398/159; 398/163; 375/316; 375/295; 375/258; 375/377; 375/219; 370/463; 370/464; 370/466; 370/538

(58) Field of Classification Search ............... 398/182, 398/183, 185, 186, 187, 192, 193, 194, 195, 398/196, 197, 198, 200, 202, 208, 214, 115, 398/135, 128, 130, 141, 153, 158, 159, 163; 370/463, 466, 464, 538; 375/258, 377, 219, 375/316, 295

See application file for complete search history.

(56) References Cited

U.S. PATENT DOCUMENTS

| | | | |
|---|---|---|---|
| 3,883,217 A | 5/1975 | Love et al. |
| 3,887,876 A | 6/1975 | Zeidler |
| 3,936,141 A | 2/1976 | Milton |
| 3,943,358 A | 3/1976 | Reymond et al. |
| 4,054,366 A | 10/1977 | Barnoski et al. |
| 4,166,946 A | 9/1979 | Chown et al. |
| 4,234,969 A | 11/1980 | Singh |
| 4,249,266 A | 2/1981 | Nakamori |
| 4,301,543 A | 11/1981 | Palmer |
| 4,307,933 A | 12/1981 | Palmer et al. |
| 4,317,614 A | 3/1982 | Palmer |
| 4,366,565 A | 12/1982 | Herskowitz |
| 4,367,460 A | 1/1983 | Hodara |
| 4,400,054 A | 8/1983 | Biard et al. |

(Continued)

FOREIGN PATENT DOCUMENTS

DE  3007958 A1  3/1984

(Continued)

OTHER PUBLICATIONS

International Search Report in related Application No. PCT/US03/03310.

(Continued)

*Primary Examiner*—Hanh Phan
(74) *Attorney, Agent, or Firm*—Kilpatrick Stockton LLP

(57) ABSTRACT

A communication system includes an optical transmitter which is differentially driven and an optical receiver that outputs a differential signal. The optical transmitter creates the differential drive signal from an input signal and delivers the differential drive signal to a laser. The differential drive signal is generated with a transformer and RF chokes for floating the laser above ground. The signal detected by the receiver is input as a differential signal to a transformer which then passes the signal through amplifiers and a filter. The optical communication system provides an increased spurious-free dynamic range which is well suited for RF signals and other analog signals.

17 Claims, 4 Drawing Sheets

U.S. PATENT DOCUMENTS

| | | | |
|---|---|---|---|
| 4,423,922 A | 1/1984 | Porter | |
| 4,435,849 A | 3/1984 | Ilgner et al. | |
| 4,446,515 A | 5/1984 | Sauer et al. | |
| 4,457,581 A | 7/1984 | Johnson et al. | |
| 4,482,980 A | 11/1984 | Korowitz et al. | |
| 4,506,153 A | 3/1985 | Ohno | |
| 4,543,574 A | 9/1985 | Takagi et al. | |
| 4,545,074 A | 10/1985 | Balliet et al. | |
| 4,554,511 A | 11/1985 | Braun | |
| 4,577,184 A | 3/1986 | Hodara et al. | |
| 4,595,839 A | 6/1986 | Braun et al. | |
| 4,630,256 A | 12/1986 | Albanese | |
| 4,654,890 A | 3/1987 | Hasegawa et al. | |
| 4,671,608 A | 6/1987 | Konishi | |
| 4,674,830 A | 6/1987 | Shaw et al. | |
| 4,705,350 A | 11/1987 | Cheng | |
| 4,715,012 A | 12/1987 | Mueller, Jr. | |
| 4,717,229 A | 1/1988 | Cutler | |
| 4,731,784 A | 3/1988 | Keller et al. | |
| 4,739,183 A | 4/1988 | Tokura et al. | |
| 4,756,595 A | 7/1988 | Braun et al. | |
| 4,759,011 A | 7/1988 | Hicks, Jr. | |
| 4,761,833 A | 8/1988 | Epworth | |
| 4,786,130 A | 11/1988 | Georgiou et al. | |
| 4,810,052 A | 3/1989 | Fling | |
| 4,829,593 A | 5/1989 | Hara | |
| 4,845,483 A | 7/1989 | Negishi | |
| 4,850,047 A | 7/1989 | Iguchi et al. | |
| 4,883,335 A | 11/1989 | Alferness et al. | |
| 4,885,589 A | 12/1989 | Edward et al. | |
| 4,898,565 A | 2/1990 | Braun | |
| 4,932,004 A | 6/1990 | Hodara et al. | |
| 4,946,244 A | 8/1990 | Schembri | |
| 4,947,134 A | 8/1990 | Olsson | |
| 4,948,218 A | 8/1990 | Kobayashi et al. | |
| 4,958,354 A | 9/1990 | Urakami et al. | |
| 4,959,837 A | 9/1990 | Fevrier et al. | |
| 5,029,306 A * | 7/1991 | Bull et al. | 342/368 |
| 5,046,137 A | 9/1991 | Kurobe et al. | |
| 5,055,827 A | 10/1991 | Philipp | |
| 5,058,101 A | 10/1991 | Albanese et al. | |
| 5,058,974 A | 10/1991 | Mollenauer | |
| 5,080,505 A | 1/1992 | Epworth | |
| 5,083,874 A | 1/1992 | Aida et al. | |
| 5,117,196 A | 5/1992 | Epworth et al. | |
| 5,117,303 A | 5/1992 | Desurvire et al. | |
| 5,129,019 A | 7/1992 | Robberg et al. | |
| 5,133,031 A | 7/1992 | Tanaka et al. | |
| 5,179,603 A | 1/1993 | Hall et al. | |
| 5,181,134 A | 1/1993 | Fatehi et al. | |
| 5,185,735 A | 2/1993 | Ernst | |
| 5,187,605 A | 2/1993 | Shikata et al. | |
| 5,189,541 A | 2/1993 | Konishi | |
| 5,212,577 A | 5/1993 | Nakamura et al. | |
| 5,222,166 A | 6/1993 | Weltha | |
| 5,267,071 A * | 11/1993 | Little et al. | 398/162 |
| 5,283,687 A | 2/1994 | Hsu et al. | |
| 5,296,957 A | 3/1994 | Takahashi et al. | |
| 5,307,197 A | 4/1994 | Tanabe et al. | |
| 5,309,564 A | 5/1994 | Bradley et al. | |
| 5,315,424 A | 5/1994 | Boden et al. | |
| 5,317,580 A | 5/1994 | Auffret et al. | |
| 5,319,642 A | 6/1994 | Ota | |
| 5,345,230 A | 9/1994 | Jackson et al. | |
| 5,347,384 A | 9/1994 | McReynolds et al. | |
| 5,361,262 A | 11/1994 | Cheung | |
| 5,363,367 A | 11/1994 | Kobayashi et al. | |
| 5,369,516 A | 11/1994 | Uchida | |
| 5,392,154 A | 2/1995 | Lin et al. | |
| 5,412,746 A | 5/1995 | Rossberg et al. | |
| 5,414,416 A | 5/1995 | Yamakita et al. | |
| 5,424,864 A | 6/1995 | Emura | |
| 5,432,874 A | 7/1995 | Muraguchi | |
| 5,434,861 A | 7/1995 | Pritty et al. | |
| 5,471,342 A | 11/1995 | Junginger et al. | |
| 5,479,082 A | 12/1995 | Calvani et al. | |
| 5,481,478 A | 1/1996 | Palmieri et al. | |
| 5,483,233 A | 1/1996 | Pettitt et al. | |
| 5,500,857 A | 3/1996 | Nakata | |
| 5,500,867 A * | 3/1996 | Krasulick | 372/38.02 |
| 5,502,589 A | 3/1996 | Yamamoto et al. | |
| 5,506,709 A | 4/1996 | Segal et al. | |
| 5,508,689 A | 4/1996 | Rado et al. | |
| 5,517,622 A | 5/1996 | Ivanoff et al. | |
| 5,528,408 A * | 6/1996 | McGinley et al. | 398/139 |
| 5,533,153 A | 7/1996 | Ota | |
| 5,539,558 A | 7/1996 | Yonemura et al. | |
| 5,541,957 A * | 7/1996 | Lau | 375/258 |
| 5,548,431 A | 8/1996 | Shin et al. | |
| 5,552,921 A | 9/1996 | Hetzel et al. | |
| 5,572,612 A | 11/1996 | Delavaux et al. | |
| 5,615,290 A | 3/1997 | Harasawa et al. | |
| 5,623,169 A | 4/1997 | Sugimoto et al. | |
| 5,664,035 A | 9/1997 | Tsuji et al. | |
| 5,684,899 A | 11/1997 | Ota | |
| 5,712,932 A | 1/1998 | Alexander et al. | |
| 5,712,937 A | 1/1998 | Asawa et al. | |
| 5,717,795 A | 2/1998 | Sharma et al. | |
| 5,732,086 A | 3/1998 | Liang et al. | |
| 5,739,938 A | 4/1998 | Goutzoulis et al. | |
| 5,745,479 A | 4/1998 | Burns et al. | |
| 5,764,821 A | 6/1998 | Glance | |
| 5,777,561 A | 7/1998 | Chieu et al. | |
| 5,778,118 A | 7/1998 | Sridhar | |
| 5,793,908 A | 8/1998 | Mizuochi et al. | |
| 5,796,890 A | 8/1998 | Tsuji et al. | |
| 5,801,865 A | 9/1998 | Weis et al. | |
| 5,809,187 A | 9/1998 | Peck, Jr. et al. | |
| 5,815,294 A | 9/1998 | Ishikawa et al. | |
| 5,825,515 A | 10/1998 | Anderson | |
| 5,825,949 A | 10/1998 | Choy et al. | |
| 5,838,989 A | 11/1998 | Hutchison et al. | |
| 5,854,698 A | 12/1998 | Eskildsen et al. | |
| 5,866,898 A | 2/1999 | Hodgson et al. | |
| 5,880,863 A | 3/1999 | Rideout et al. | |
| 5,894,362 A | 4/1999 | Onaka et al. | |
| 5,896,417 A * | 4/1999 | Lau | 375/258 |
| 5,898,673 A | 4/1999 | Riggan et al. | |
| 5,898,801 A | 4/1999 | Braun et al. | |
| 5,901,260 A | 5/1999 | Braun et al. | |
| 5,910,851 A | 6/1999 | Flaherty | |
| 5,937,032 A | 8/1999 | Nummelin et al. | |
| 5,943,148 A | 8/1999 | Hamel et al. | |
| 5,949,560 A | 9/1999 | Roberts et al. | |
| 5,959,412 A * | 9/1999 | Ushijima | 315/276 |
| 5,995,258 A | 11/1999 | Weber et al. | |
| 6,008,915 A | 12/1999 | Zyskind | |
| 6,014,481 A | 1/2000 | Kremers | |
| 6,075,628 A | 6/2000 | Fisher et al. | |
| 6,075,648 A | 6/2000 | Yamamoto et al. | |
| 6,084,233 A | 7/2000 | Hodgson et al. | |
| 6,111,888 A | 8/2000 | Green et al. | |
| 6,122,095 A | 9/2000 | Fatehi | |
| 6,128,111 A | 10/2000 | Roberts | |
| 6,140,920 A | 10/2000 | Roberts | |
| 6,157,725 A | 12/2000 | Becker | |
| 6,175,533 B1 | 1/2001 | Lee et al. | |
| 6,345,137 B1 | 2/2002 | Imajo | |
| 6,385,366 B1 | 5/2002 | Lin | |
| 6,426,815 B1 | 7/2002 | Kohler | |
| 6,449,072 B1 | 9/2002 | Sian et al. | |
| 6,499,027 B1 | 12/2002 | Weinberger | |
| 6,502,131 B1 | 12/2002 | Vaid et al. | |
| 6,567,197 B1 | 5/2003 | Glance | |

| | | |
|---|---|---|
| 6,782,422 B1 | 8/2004 | Bahl et al. |
| 6,784,837 B2 | 8/2004 | Revankar et al. |
| 6,830,221 B1 | 12/2004 | Janson et al. |
| 6,912,339 B2 | 6/2005 | Whittaker |
| 2002/0018260 A1 | 2/2002 | Kisovec et al. |
| 2002/0032780 A1 | 3/2002 | Moore et al. |
| 2002/0044565 A1 | 4/2002 | Park |
| 2002/0065962 A1 | 5/2002 | Bakke et al. |
| 2002/0083169 A1 | 6/2002 | Aki et al. |
| 2002/0101636 A1 | 8/2002 | Xiao et al. |
| 2002/0101874 A1 | 8/2002 | Whittaker et al. |
| 2003/0025967 A1 | 2/2003 | Tai |
| 2003/0176196 A1 | 9/2003 | Hail et al. |
| 2003/0204789 A1 | 10/2003 | Peebles et al. |
| 2003/0206134 A1 | 11/2003 | Lier et al. |
| 2004/0043795 A1 | 3/2004 | Zancewicz |
| 2004/0076429 A1 | 4/2004 | Meroth et al. |
| 2004/0076434 A1 | 4/2004 | Whittaker et al. |
| 2005/0213973 A1 | 9/2005 | Rohner et al. |

FOREIGN PATENT DOCUMENTS

| | | |
|---|---|---|
| DE | 3807072 A1 | 8/1988 |
| DE | 3938856 A1 | 11/1989 |
| DE | 4331330 A1 | 9/1993 |
| DE | 4226838 | 2/1994 |
| DE | 4427187 A1 | 2/1996 |
| EP | 0 069 356 A2 | 1/1983 |
| EP | 000103873 A2 | 3/1984 |
| EP | 0 105 753 A2 | 4/1984 |
| EP | 0 164 652 A2 | 12/1985 |
| EP | 0 231 635 A2 | 8/1987 |
| EP | 0 356 090 A2 | 2/1990 |
| EP | 0 380 341 A2 | 8/1990 |
| EP | 0 393 293 | 10/1990 |
| EP | 0 414 333 A2 | 2/1991 |
| EP | 0 414 333 A3 | 2/1991 |
| EP | 0 905 936 A2 | 3/1991 |
| EP | 0 451 426 | 10/1991 |
| EP | 0 503 212 | 9/1992 |
| EP | 0 739 103 A2 | 10/1996 |
| EP | 0 744 797 A1 | 11/1996 |
| EP | 0 899 161 A1 | 3/1999 |
| EP | 0 350 720 A2 | 1/2001 |
| EP | 0 350 720 A3 | 1/2001 |
| EP | 1 246 378 A2 | 10/2002 |
| FR | 2574565 | 6/1986 |
| GB | 2073877 | 10/1981 |
| GB | 2087679 | 5/1982 |
| GB | 2102232 | 1/1983 |
| GB | 2189961 | 11/1987 |
| GB | 2255683 | 11/1992 |
| JP | 11-87823 | 7/1989 |
| JP | 7-202921 | 8/1995 |
| JP | 9/51322 | 2/1997 |
| JP | 9-321739 | 12/1997 |
| JP | 10-107773 | 4/1998 |
| JP | 11-331224 | 3/1999 |
| WO | WO 93/03406 | 2/1993 |
| WO | WO 00/57582 | 9/2000 |

OTHER PUBLICATIONS

International Search Report in related Application No. PCT/US03/03329.
International Search Report in related Application No. PCT/US03/10053.
International Search Report in related Application No. PCT/US03/30326.
International Search Report in related Application No. PCT/US03/29970.
Stewart D. Personick, *Optical Fiber Transmission Systems*, pp. 1-3 (1981).
H. Hodara, and E. Miles, "High-Speed Local Area Networks", *Fiber and Integrated Optics*; (1992) pp. 253-277.
N.A. Olsson, Lightwave Systems With Optical Amplifiers, *Journal of Lightwave Technology*, pp. 1071-1082 (Jul. 1989).
ITU-T Recommendation G.681, Series G: Transmission Systems and Media, Digital Systems and Networks; Functional characteristics of interoffice and long-haul systems using optical amplifiers, including optical multiplexing (Oct. 1996).
ITU-T Recommendation G.692, Series G: Transmission Systems and Media, Digital Systems and Networks: Optical Interfaces for multichannel systems with optical amplifiers (Oct. 1998).
Chart and figures for optical fiber cable and baseband transmission, available at http://www.microsoft.com/technet/WFW/wfw31/1_ch1.asp.
HDR 7.0 2 73; 7.0 Fiber Optic Ethernet—Types FOIRL and 10 BASE-F available at http://www.uni-trier.de/infos/ether/ethernet-guide/ethernet-guide.html.
3.0 IEEE Acronyms, available at http://spacey.net/ldavis/Design_Ethernet_Note.html, no date.
Fibre Channel—Overview of the Technology, Sep. 9, 2000, pp. 1-9 available at http://fibrechannel.org/technology.
Bi-Directional Optical Backplane Bus for Board to Board Optoelectronic Interconnects, Gicheri Kim, Jinghuai Fa and Ray T. Chen, 1-4 (Sep. 9, 2000) available at http://ece.utexas.edu/projects/ece/mrc/profs/chen_projects/optbus/optbus.html.
Some Bus (Simultaneous Optical Multiprocessor Exchange Bus)(Sep. 9, 2000) available at http://eb.uah.edu/-cohen/some_bus/some_bus.html.
Integrated Explorations of the Spectral, Temporal and Spatial Degrees of Freedom 1 (Sep. 9, 2000) available at http://thebusinessedge.com/reruns/cito/sargent/sld001.htm.
Challenges in IP LANs on Higher-Dimensional Encoding (slide 4) (Sep. 9, 2000) available at http://thebusinessedge.com/reruns/cito/sargent/sld004.htm.
0034-P PCI 1-Gig Fibre Channel Optical Host Bus Adapter 1-4 available at http://solutions.sun.com/dbsearch/index.cgi?STATE=product&CMD=show&p_id=58181 (Sep. 9, 2000).
Architectural and Engineering Issues for Building an Optical Internet 1-55 (Sep. 9, 2000) available at http://www.canet3.net/papers/ArchandEngIssues.html.
Baker, *Monomode Fiber-Optic Design with Local- Area and Long-Haul Network Applications*, pp. 370-371.
Karim, *Chapter 9: Electro-Optical Devices and Systems*, Fiber-Optics-Based Devices and Systems, pp. 434-435.
Chinlon Lin, *Systems Applications of WDM Technologies in Optical Communications*, SPIE-International Society for Optical Engineering (Aug. 15-18, 1994).
Francesco Matera & Marina Settembre, *Performance Evaluation of Optically Amplified Systems Operating in Optical Networks*, Microwave & Optical Technology Letters (Nov. 1996).
Spirit et al., *140-km 20-Gbit/s repeaterless transmission employing distributed erbium amplification*, Optical Fiber Communication Conference (1992).
Philip J. Koopman, Jr., and Bhargav P. Upender., "Time Division Multiple Access Without a Bus Master," United Technologies Research Center, UTRC Technical Report RR-9500470 (Jun. 1995).
Technical Report CSRI-298 entitled "A New Binary Logarithmic Arbitration Method for Ethernet," by Mart L. Molle of Computer Systems Research Institute, pp. 1-57 (Apr. 1994).
WRL Research Report 88/4 entitled "Measured Capacity of an Ethernet: Myths and Reality" by David R. Boggs, et al., printed by Digital Western Research Laboratory, Palo Alto, California (Sep. 1998) (pp. 1-31), originally published in *Proceedings of the SIGCOMM '88 Symposium on Communications Architectures and Protocols*, ACM SIGCOMM, Stanford, California, Aug. 1988.
Yamashita, et al., "Studies of a system gathering multi-channel visual signals using a single optical fiber and a bi-directional optical amplifier," *T.IEE* Japan, 119-C(12):1528-1534 (1999).
Kempainen, "Optical Networking lightens carrier-backbone burden," *EDN*, pp. 63, 64, 65, 66, 68, 70, 72 (Oct. 8, 1998).
Thomas, et al., "Physics in the Whirlwind of Optical Communications," *Physics Today*, pp. 30-36 (Sep. 2000).

Press Release entitled "Lucent Technologies announces record-breaking 320-channel optical networking system," (pp. 1-2) (Apr. 17, 2000).

Iannone, et al., "A 160-km transparent metro WDM ring network featuring cascaded erbium-doped waveguide amplifiers," published by Optical Society of America (2000).

"Performance Management—Management of SONET Networks—White Paper," Clear Communications, *Sonet and Performance Management*, Issue 1, Apr. 1996 (pp. 1-21).

*Cisco Wavelength Router Manager—Data Sheet, www.cisco.com/warp/public/cc/so/neso/olso/cwm_ds.htm* (Apr. 25, 2001).

Keyserling, A. and R.C.L., "Chapter 2: Number, Dimensions, Manderlbrot, Chaos, 4 Attractors, Music and Color," www.chanceandchoice.com/ChanceandChoice/chapter2.html.

Gallardo, et al., "Fast Simulation of Broadband Telecommunications Networks Carrying Long-Range Dependent Bursty Traffic," Preceedings of the 1999 Winter Simulation Conference, pp. 374-381 (Winter 1999).

Willinger, et al., "Self-Similarity Through High-Variability: Statisitical Analysis of Ethernet LAN Traffic at the Source Level," pp. 1-31 (Apr. 15, 1997).

DeCotignie, J.D., et al., "Producer-Distributor-Consumer Model on Controller Area Network," Proceedings of the IFAC/IFIC Workshop, Real Time Programming, 1995, pp. 35-42, XP002074139, Oxford, Great Britain.

Liew, "A Broad-Band Optical Network Based on Hierarchical Multiplexing of Wavelengths and RF Subcarariers," *Journal of Lightwave Technology*, 7(11):1825-1838 (1989).

Al-Raweshidy and Komaki (Editors), "Basic Microwave Properties of Optical Links," *Radio Over Fiber Technologies for Mobile Communication Networks*, pp. 7-16 (Published by Artech House, Norwood, Massachusetts) (2002).

Fibre Channel Overview http://his.web.cem.ch/HIS/fcs/spec/overview.htm, pp. 1-10 (Nov. 5, 2002).

HomeNetHelp.com, http://www.homenethelp.com/web/explain.about-hubs-and-switches.asp, 5 pages (Nov. 5, 2002).

Stewart D. Personick, *Optical Fiber Transmission Systems*, pp. 1-3 (1981).

H. Hodara, and E. Miles, "High-Speed Local Area Networks", *Fiber and Integrated Optics*; (1992) pp. 253-277.

N.A. Olsson, Lightwave Systems with Optical Amplifiers, *Journal of Lightwave Technology*, pp. 1071-1082 (Jul. 1989).

ITU-T Recommendation G.681, Series G: Transmission Systems and Media, Digital Systems and Networks; Functional characteristics of Interoffice and long-haul systems using optical amplifiers, including optical multiplexing (Oct. 1996).

ITU-T Recommendation G.692, Series G: Transmission Systems and Media, Digital Systems and Networks; Optical Interfaces for multichannel systems with optical amplifiers (Oct. 1998).

Chart and figures for optical fiber cable and baseband transmission, available at http://www.microsoft.com/technet/WFW/wfw31/1_ch1.asp, 1999.

HDR 7.0 2 73; 7.0 Fiber Optic Ethernet—Types FOIRL and 10 BASE-F available at http://uni-trier.de/infos/ether/ethernet-guide/ethernet-guide.html, 1994.

3.0 IEEE Acronyms, available at http://spacey.net/ldavis/Design_Ethernet_Note.html, 2000.

Fibre Channel - Overview of the Technology, Sep. 9, 2000, pp. 1-9 available at http://fibrechannel.org/technology.

Bi-Directional Optical Backplane Bus for Board to Board Optoelectronic Interconnects, Gicheri Kim, Jinghuai Fa and Ray T. Chen, 1-4 (Sep. 9, 2000) available at http://ece.utexas.edu/projects/ece/mrc/profs/chen_projects/optbus/optbus.html.

SOME Bus (Simultaneous Optical Multiprocessor Exchange Bus)(Sep. 9, 2000) available at http://eb.uah.edu/-cohen/some_bus/some_bus.html.

Integrated Explorations of the Spectral, Temporal and Spatial Degrees of Freedom 1 (Sep. 9, 2000) available at http://the businessedge.com/reruns/cito/sargent/sld001.htm.

Challenges in IP LANs on Higher-Dimensional Encoding (slide 4) (Sep. 9, 2000) available at http://the businessedge.com/reruns/sargent/sld004.htm.

0034-P PCI 1-Gig Fibre Channel Optical Host Bus Adapter 1-4 available at http://solutions.sun.com/dbsearch/index.cgi?STATE=product&CMD=show&p_id=58181 (Sep. 9, 2000).

Architectural and Engineering Issues for Building an Optical Internet 1-55 (Sep. 9, 2000) available at http://www.canet3.net/papers/ArchandEngissues.html.

Baker, *Monomode Fiber-Optic Design with Local- Area and Long-Haul Network Applications*, pp. 370-371, 1987.

Karim, *Chapter 9: Electro-Optical Devices and Systems*, Fiber-Optics-Based Devices and Systems, pp. 434-435, 1990.

Chinion Lin, *Systems Applications of WDM Technologies in Optical Communications*, SPIE-International Society for Optical Engineering (Aug. 15-18, 1994).

Manuel Lopez-Amo, Loudon T Blair & Paul Urquhart, *Wavelength-Division-Multiplexed distributed optical fiber amplifier bus network for date and sensors*, Optics Letter 1159-61(Jul. 15, 1993).

Francesco Matera & Marina Settembre, *Performance Evaluation of Optically Amplified Systems Operating in Optical Networks*, Microwave & Optical Technology Letters (Nov. 1996).

Spirit et al., *140-km 20-Gbit/s repeaterless transmission employing distributed erbium amplification*, Optical Fiber Communication Conference (1992).

Philip J. Koopman, Jr., and Bhargav P. Upender., "Time Division Multiple Access Without a Bus Master," United Technologies Research Center, UTRC Technical Report RR-9500470 (Jun. 1995).

Technical Report CSRI-298 entitled "A New Binary Logarithmic Arbitration Method for Ethernet," by Mart L. Molle of Computer Systems Research Institute, pp. 1-57 (Apr. 1994).

WRL Research Report 88/4 entitled "Measured Capacity of an Ethernet: Myths and Reality" by David R. Boggs, et al., printed by Digital Western Research Laboratory, Palo Alto, California (Sep. 1998) (pp. 1-31), originally published in *Proceedings of the SIGCOMM '88 Symposium on Communications Architectures and Protocols*, ACM SIGCOMM, Stanford, California, Aug. 1988.

Yamashita, et al., "Studies of a system gathering multi-channel visual signals using a single optical fiber and a bi-directional optical amplifier," *T.IEE Japan*, 119-C(12):1528-1534 (1999).

Kempainen, "Optical Networking lightens carrier-backbone burden," *EDN*, pp. 63, 64, 65, 66, 68, 70, 72 (Oct. 8, 1998).

Thomas, et al., "Physics in the Whirlwind of Optical Communications,"*Physics Today*, pp. 30-36 (Sep. 2000).

Press Release entitled "Lucent Technologies announces record-breaking 320-channel optical networking system," (pp. 1-2) (Apr. 17, 2000).

Jannone, et al., "A 160-km transport metro WDM ring network featuring cascaded erbium-doped waveguide amplifiers," published by Optical Society of America (2000).

"Performance Management -Management of SONET Networks - White Paper," Clear Communications, *Sonet and Performance Management*, Issue 1, Apr. 1996 (pp. 1-21).

Cisco Wavelength Router Manager - Data Sheet, www.cisco.com/warp/public/cc/so/neso/olso/cwrm_ds.htm. (Apr. 25, 2001).

Keyserling, A. and R.C.L., "Chapter 2: Number, Dimensions, Manderlbrot, Chaos, 4 Attractors, Music and Color," www.chanceandchoice.com/ChanceandChoice/chapter2.html, 1995.

Gallardo, et al., "Fast Simulation on Broadband Telecommunications Networks Carrying Long-Range Dependent Bursty Traffic," Preceedings of the 1999 Winter Simulation Conference, pp. 374-381 (Winter 1999).

Willinger, et al., "Self-Similarity Through High-Variability: Statiscal Analysis of Ethernet LAN Traffic at the Source Level," pp. 1-31 (Apr. 15, 1997).

DeCotignie, J.D., et al., "Producer-Distributor-Consumer Model on Controller Area Network," Proceedings of the IFAC/IFIC Workshop, Real Time Programming, 1995, pp. 35-42, XP002074139, Oxford, Great Britain.

Liew, "A Broad-Band Optical Network Based on Hierarchical Multiplexing of Wavelengths and RF Subcarariers," *Journal of Lightwave Technology*, 7(11): 1825-1838 (1989).

Al-Raweshidy and Komaki (Editors), "Basic Microwave Properties of Optical Links," *Radio Over Fiber Technologies for Mobile Communication Networks*, pp. 7-16 (Published by Artech House, Norwood, Massachusetts) (2002).

Fibre Channel Overview http://his.web.cem.ch/HIS/fcs/spec/overview.htm, pp. 1-10 (Nov. 5, 2002).

Ethernet FAST Ethernet Fiber Optic Media Converters, http://www.versitron.com/Ethernet.html, 2 pages (Nov. 5, 2002).

HomeNetHelp.com, http://www.homenethelp.com/web/explain.about-hubs-and-switches.asp, 5 pages (Nov. 5, 2002).

Fibre Channel, http://www.iol.unh.edu/training/fc/fc_tutorial.html, 22 pages (Nov. 5, 2002).

* cited by examiner

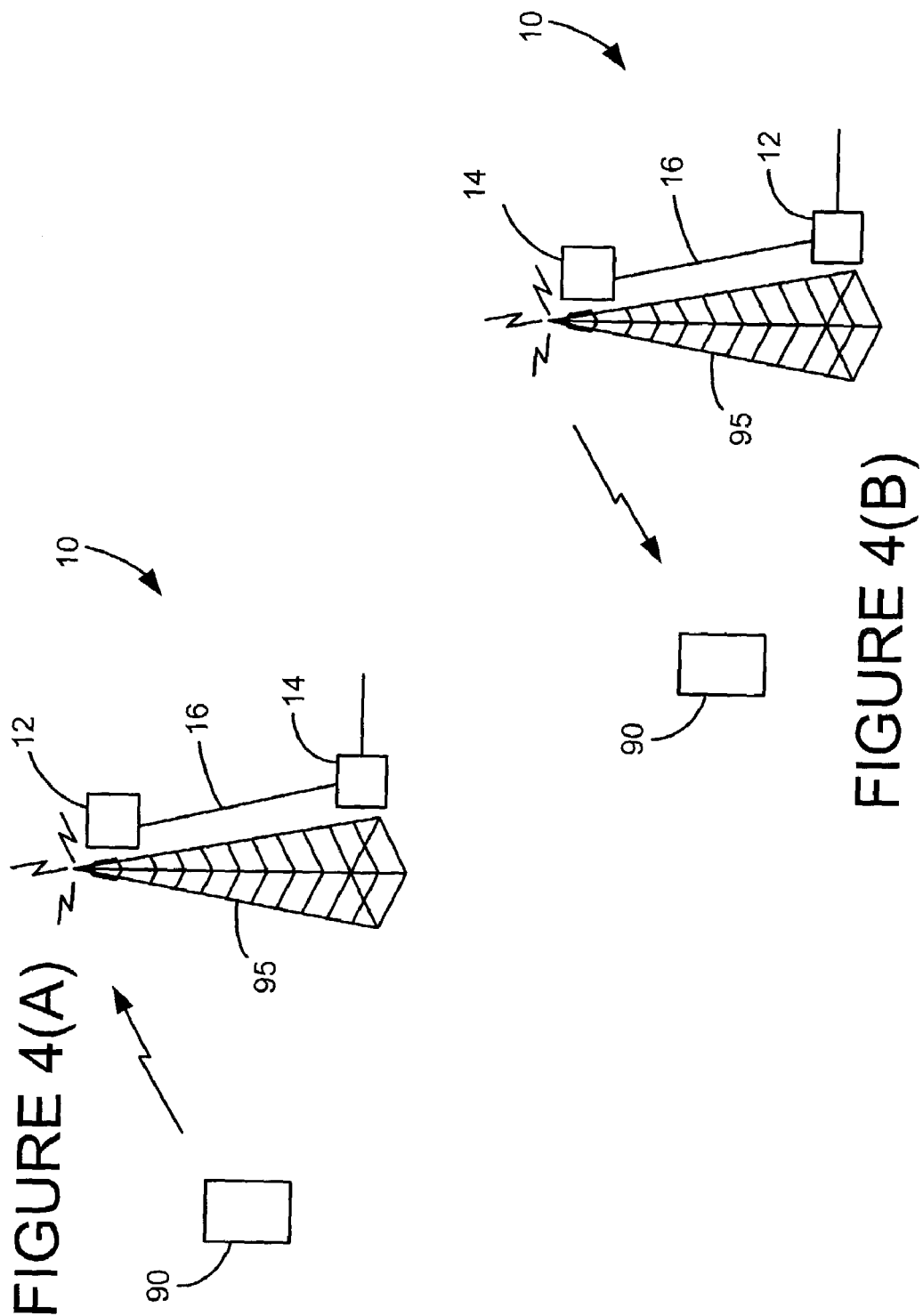

HIGH DYNAMIC RANGE RADIO FREQUENCY TO OPTICAL LINK

FIELD OF THE INVENTION

The invention relates to systems and methods for transmitting signals over an optical link and, more particularly, to systems and methods for transmitting radio frequency signals over an optical link.

BACKGROUND

Optical communication systems have many advantages over communication systems that transmit electrical signals. For one, electrical signals are susceptible to electromagnetic noise whereby great care must be taken to shield those signals from sources of electromagnetic radiation. On the other hand, optical signals are relatively immune to electromagnetic radiation and can be easily shielded during transmission. Additionally, electrical signals can be transmitted for only relatively small distances since they incur losses proportional to the square of the distance. Optical signals, on the other hand, can be transmitted for great distances with little or no loss. For these and other reasons, many communications systems incorporate optical signals.

Optical communication systems are rather limited in transmitting radio frequency (RF) signals and other analog signals encoded with a high degree of information. Optical communication systems have a limited spurious-free dynamic range (SFDR). A relatively low SFDR, in turn, requires that the communication signals be at a relatively high optical signal to noise level.

As a practical matter, the relatively low SFDR of optical communication systems limits where the benefits of an optical communication can be reaped. As one example, optical communication systems are used in conjunction with wireless networks. The optical communication system may carry signals between switches within the network and/or from a base station up to the antenna in a tower. The optical communication system in this example transmits the signals over an optical fiber in order to achieve the advantages of low losses and low susceptibility to noise. These wireless networks must perform a great deal of processing of the electrical signals detected at the tower before they can be converted into optical signals and transmitted over a fiber to a remote location. As noted above, the optical communication system has a relatively low SFDR and cannot directly receive RF signals having a low optical signal to noise level. Consequently, the RF signals may be need to be converted into digital signals or undergo extensive filtering and amplification before they are converted into optical signals. This processing adds a cost to the network which may render it impractical to implement an optical communication system.

SUMMARY

The invention addresses the problems above by providing systems and methods for transmitting and receiving optical signals. The systems according to the invention include an optical transmitter having an optical generator, such as a laser or light emitting diode (LED). An input signal is converted into a differential signal and this differential signal is used to drive the optical generator. In the preferred embodiment, an input signal is amplified and then delivered to a primary winding of a transformer. A secondary winding of the transformer has one end connected to the optical generator and a second end connected to ground through an RF choke. In the preferred embodiment, the optical generator is a laser and the optical transmitter includes a thermoelectric cooling circuit for controlling an operating temperature of the laser and a current driving circuit for providing a constant current driving signal to the laser. The differential signal generated by the input signal is then delivered to the laser in order to modulate the optical out put of the laser.

The optical communication system includes an optical receiver with a photodiode or other suitable photodetector. An output from the photodiode is a differential signal provided to a primary winding of a transformer. A secondary winding of the transformer is connected to one or more amplifiers and a filter for selecting a desired frequency band.

The optical communication system has a greatly increased spurious-free dynamic range (SFDR). In one embodiment, the SFDR is calculated to be 121 dB to the ⅔ Hz. The optical communication system therefore is less susceptible to noise and distortion and better able to transmit optical signals.

The communication system is well suited for carrying radio frequency (RF) signals and other analog signals because of its high SFDR. One application of the communication system is in a wireless network with the optical transmitter receiving RF signals and sending optical signals over an optical link to the optical receiver. Additionally, a second optical transmitter may send optical signals in an opposite direction up the optical link to a second optical receiver which then delivers RF signals to an antenna for transmission to a wireless device.

Other advantages and features of the invention will be apparent from the description below, and from the accompanying papers forming this application.

BRIEF DESCRIPTION OF DRAWINGS

The accompanying drawings, which are incorporated in and form a part of the specification, illustrate preferred embodiments of the present invention and, together with the description, disclose the principles of the invention. In the drawings:

FIGS. 4(A) and 4(B) illustrate exemplary uses of the communication system in a wireless network.

DETAILED DESCRIPTION

Reference will now be made in detail to preferred embodiments of the invention, non-limiting examples of which are illustrated in the accompanying drawings.

Figure 1:
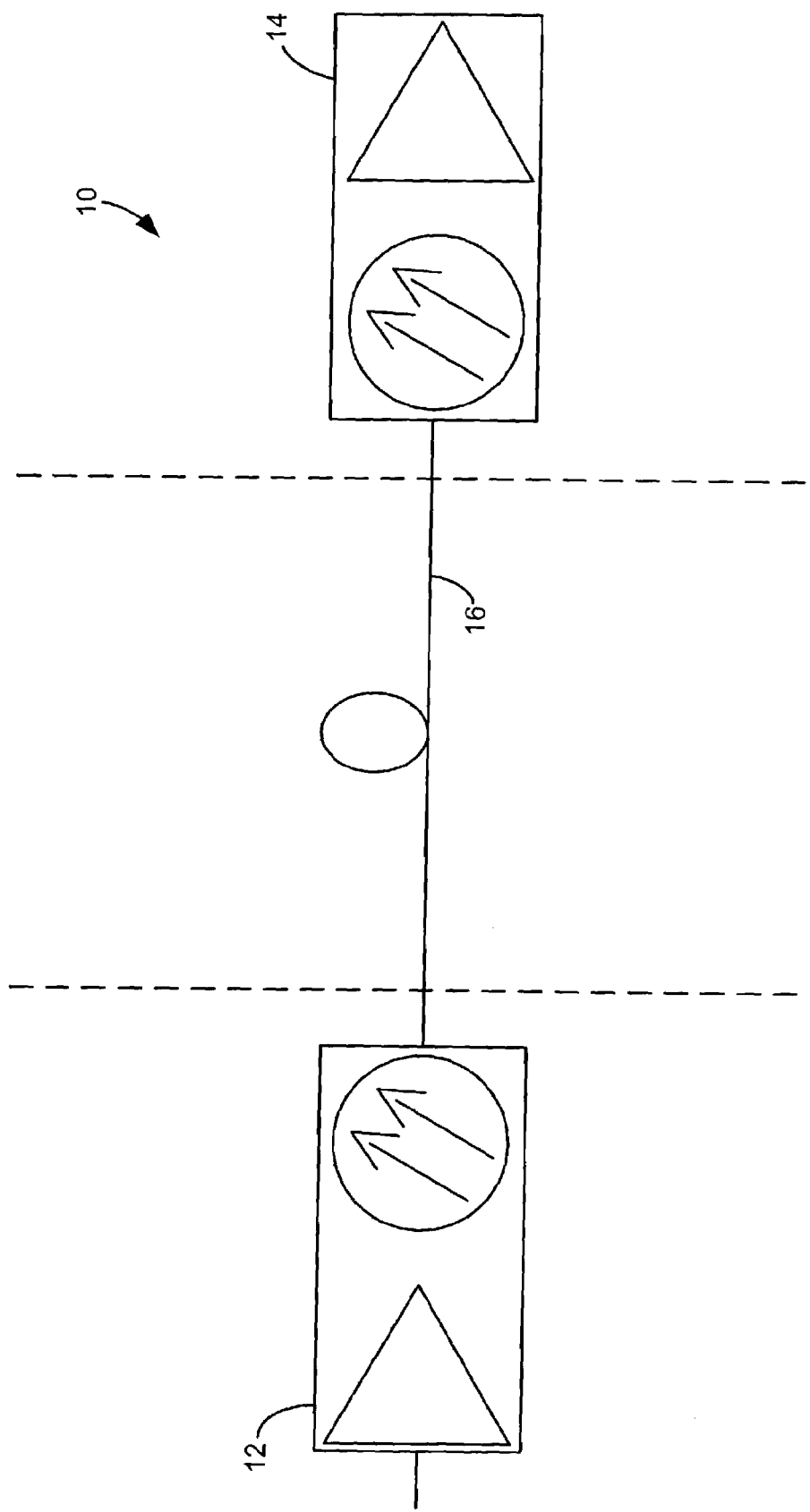
FIG. 1 is a diagram of a communication system according to a preferred embodiment of the invention.

With reference to FIG. 1, an optical communication system 10 according to a preferred embodiment of the invention includes an optical transmitter 12 and an optical receiver 14. In this example, the optical transmitter 12 transmits optical signals over an optical fiber 16 to the optical receiver 14. In other embodiments of the invention, however, the optical transmitter 12 may transmit optical signals through other media, such as through the air. Furthermore, the system 10 shows in FIG. 1 represents a simple point-to-point system between one transmitter 12 and one receiver 14. It should be understood that the communication system 10 according to the invention may incorporate a greater number of transmitters 12 and/or a greater number of receivers 14. The network topology may also be other than a point-to-point network, such as a star, ring, broken ring, or bus network. One suitable network topology is shown and described in U.S. Pat. No. 5,898,801, which is incorporated herein by reference.

Figure 2:
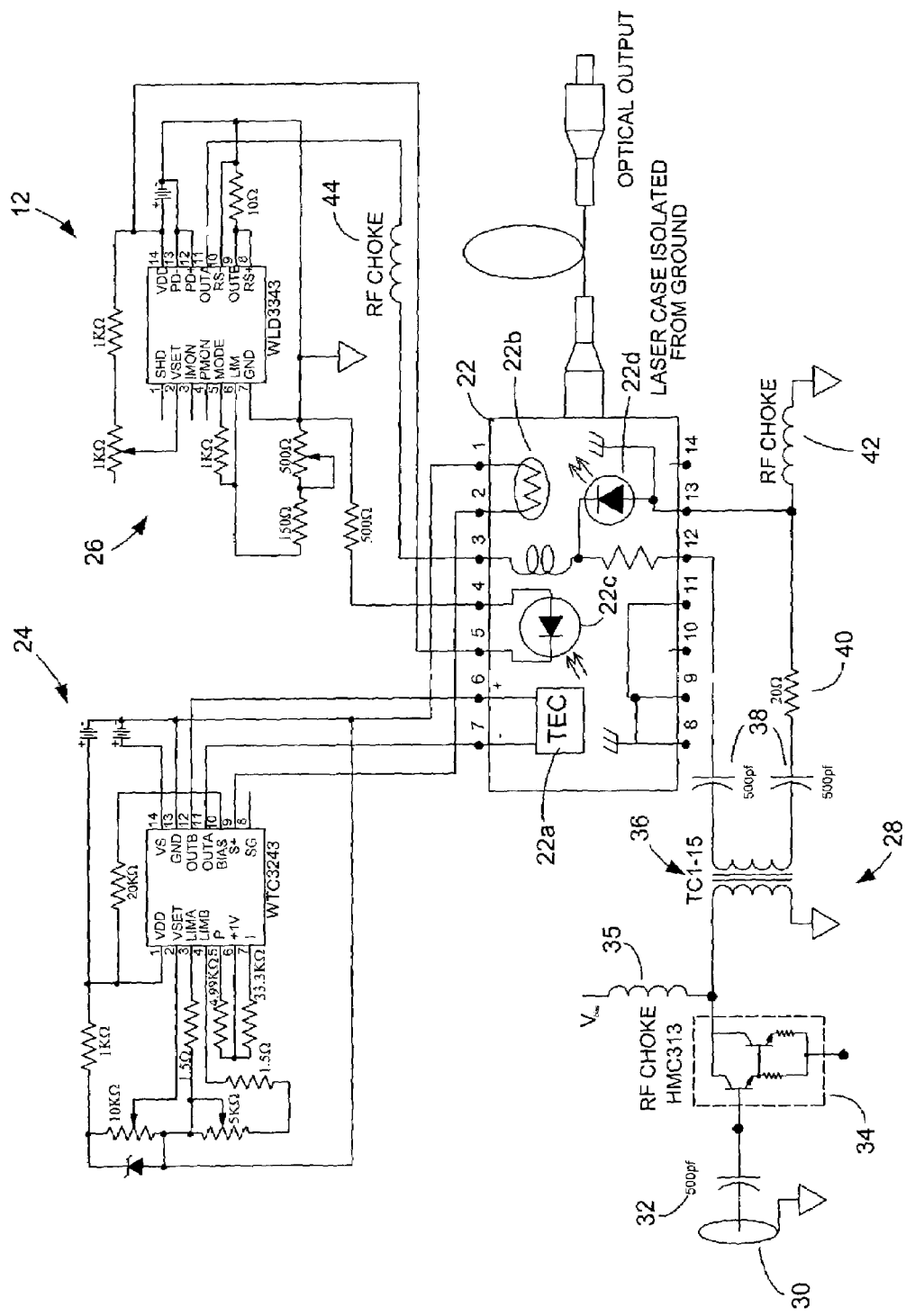
FIG. 2 is a circuit diagram of an optical transmitter according to a preferred embodiment of the invention.

FIG. 2 illustrates a preferred circuit diagram for the optical transmitter 12 according to the preferred embodiment of the invention. The transmitter 12 includes an optical generator 22, which in this preferred embodiment comprises a laser. While the optical generator 22 preferably comprises a Distributed Feedback (DFB) laser, the optical generator 22 may comprise other types of devices or systems for generating optical signals, such as Light Emitting Diode (LEDs), or Vertical Cavity Surface Emitting Laser (VCSEL). More preferably, the optical generator 22 comprises a model FLD3F7CZ from Fujitsu Compound Semiconductor, Inc., of San Jose, Calif. The laser 22 includes a thermoelectric cooler (TEC) 22a for providing a stable operating temperature for the laser 22. The laser 22 also includes a thermistor 22b for detecting the operating temperature. A temperature control circuit 24 is connected to the thermistor 22b and thus receives a temperature signal representing the temperature of the laser 22. The temperature control circuit 24 provides an output to the TEC 22a so as to maintain a desired operating temperature for the laser 22. The temperature control circuit 24 preferably includes an ultrastable temperature controller model WTC3243 from Wavelength Electronics, Inc., of Boseman, Mont. for example.

The optical transmitter 12 also includes a current driving circuit 26. The current driving circuit 26 is configured to provide a specified amount of current, which is preferably 150 mA. The current driving circuit 26 preferably includes an ultrastable driver for laser diodes model WLD3343 from Wavelength Electronics, Inc or equivalent.

The optical transmitter 12 also includes a differential drive circuit 28. The differential drive circuit 28 includes an input 30, an amplifier 34, and a capacitor 32 for filtering DC signals. The amplifier 34 in the preferred embodiment comprises a broadband amplifier gain block model HMC313 from Hittite Microwave Corporation of Chelmsford, Mass. or equivalent. An output from the amplifier 34 is input to a primary winding of a transformer 36. Additionally, an RF choke 35 is connected to the output of the amplifier 34 and receives a bias voltage $V_{bias}$. A secondary winding of the transformer 36 provides a differential drive signal for the laser 22. A pair of capacitors 38 provide DC filtering and a path to ground is provided through a resistor 40 and an RF choke 42.

Rather than connecting pin 13 of the laser 22 to ground as is the conventional practice, the optical transmitter 12 provides a differential drive signal across pins 12 and 13. Pin 13 of the laser 22 therefore floats above ground through its connection to the RF choke 42. The differential drive signal is also generated in part through the use of an RF choke 44 positioned between the laser 22 and the current driving circuit 26. The constant current provided by the current driving circuit 26 therefore passes through the RF choke 44 before being delivered to the laser 22. The RF chokes 42 and 44 play an important role in isolating the DC source of current from the input 30. In other words, the differential drive signal generated by the differential drive circuit 28 is isolated from the current signal generated by the current driving circuit 26.

Typically, an output from the amplifier 34 is provided to pin 12 of the laser 22. In this arrangement, the impedance of the amplifier 34 is 50 ohms whereas the impedance of the laser 22 is 20 ohms. In contrast, the differential drive circuit 28 is designed so that it has an effective impedance of 20 ohms and matches the input impedance of the laser 22. By impedance matching the differential drive circuit 28 with the laser 22, the optical transmitter 12 delivers a maximum amount of power to the laser 22. The resistor 40 has an impedance of 20 ohms which is selected to match that of the laser 22.

The optical transmitter 12 has a greatly improved spurious-free dynamic range (SFDR). The estimated SFDR for the optical transmitter 12 is 121 dB to the ⅔ Hz. This higher measurement of SFDR translates to less distortion of the optical signals being generated by the optical transmitter 12. The typical SFDR for an optical transmitter is 114 dB to the ⅔ Hz.

Figure 3:
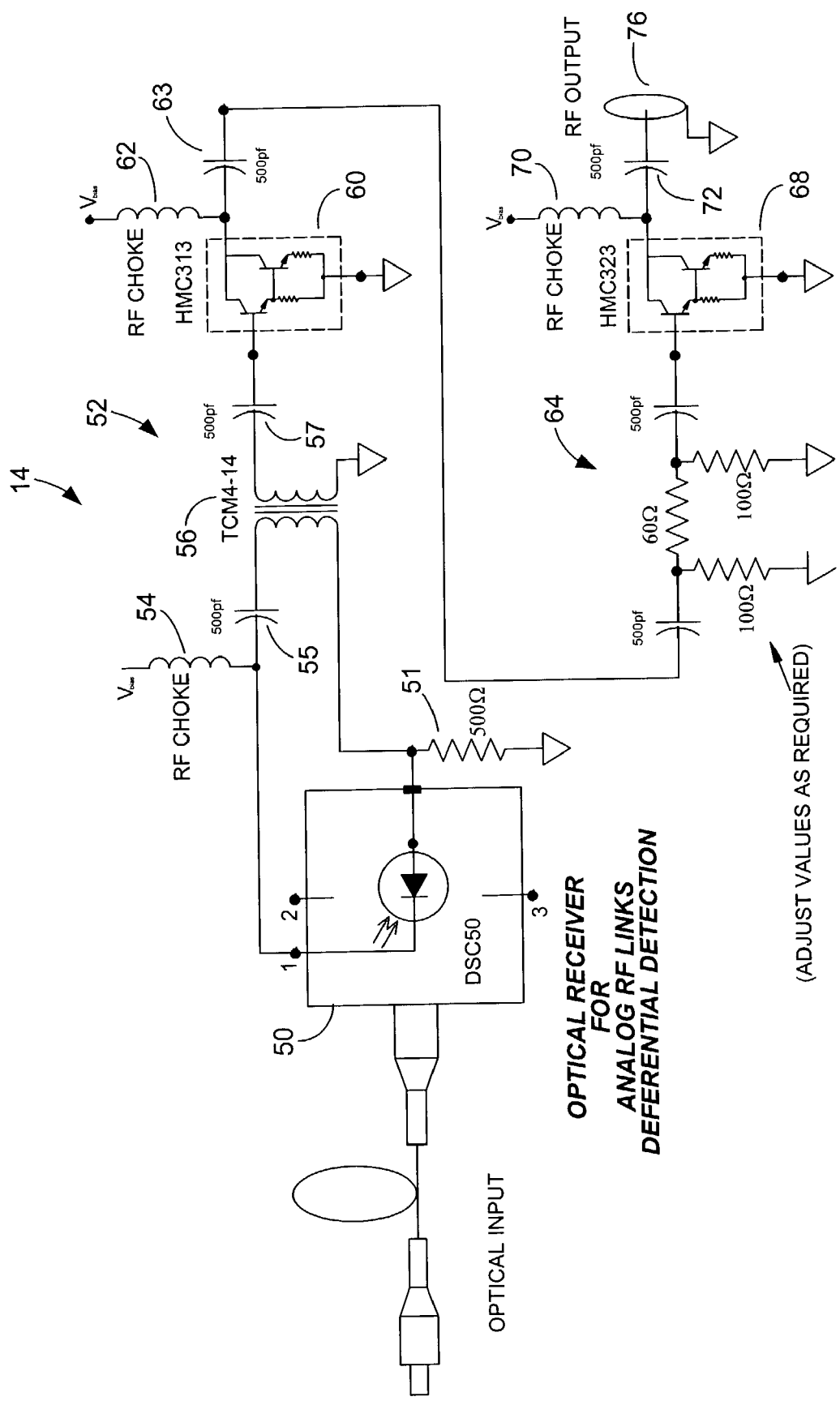
FIG. 3 is a circuit diagram of an optical receiver according to a preferred embodiment of the invention.

FIG. 3 illustrates a preferred circuit diagram for the optical receiver 14. The optical receiver 14 includes a photodetector 50 which is preferably a photo diode. In this example, the photodiode 50 is a wide bandwidth InGaAs PIN diode model DSC50 from Discovery Semiconductors, Inc. of Ewing, N.J. or equivalent. The output from the photodiode 50 is provided to a primary winding on a transformer 56. An RF choke 54 is connected between the output of the photodiode 50 and a bias voltage $V_{bias}$ and is also connected to the primary winding of the transformer 56 through a DC filtering capacitor 55. The other end of the primary winding of the transformer 56 is connected to ground through a resistor 51. The biasing of the photodiode 50 through the RF choke 54 and transformer 56 provides a differential output signal which is amplified by amplifier 60 and amplifier 68. A filter 64 may be provided which has an impedance selected to pass frequencies of interest to the optical receiver 14. The optical receiver 14 may also include capacitors 57, 63, and 72 for removing any DC components in the received signals. The optical receiver 14 also includes RF chokes 72 and 70 for isolation of RF signals entering the circuit via the power distribution system. These RF chokes also improve the stability of the amplifiers by reducing any feedback energy which could cause the amplifiers to oscillate. An output signal 76 is provided by the optical receiver 14.

The system 10 is especially beneficial in transmitting radio frequency (RF) signals. RF signals and other high frequency analog signals are very susceptible to noise and distortion. Because the optical transmitter 12 has an increased SFDR at 121 dB to the ⅔ Hz, the communication system 10 is better able to transmit and receive RF signals. One environment in which the communication system 10 is especially well suited is that of wireless communications. For instance, FIG. 4(A) illustrates the communication system 10 in a mobile radio-telephone network. A wireless device 90 generates signals which are received at an antenna 95. The optical transmitter 12 receives the signals from the antenna 95, converts them into optical signals, and transmits the optical signals over the fiber 16 to the optical receiver 14. FIG. 4(B) illustrates the transmission of signals to the wireless device 90. The optical transmitter 12 passes optical signals over the optical fiber 16 to the optical receiver 14 which, in turn, delivers the signals to the antenna 95 for transmission to the wireless device 90. In this example, the wireless device 90 and the antenna 95 operate in the RF spectrum, such as with cellular, PCS, 3G, or GSM service. It should be understood that the communication system 10 may be adopted in other portions of the electromagnetic spectrum.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

The invention claimed is:

1. An optical transmitter, comprising:
an optical generator having a pair of input terminals for receiving a differential electrical drive signal and for outputting a corresponding optical signal;
an input port for receiving an input electrical signal;
a transformer having a primary winding and a second winding, the primary winding receiving the input electrical signal from the input port;
a choke connected to one end of the secondary winding of the transformer and connected directly to a first input terminal of the pair of input terminals to the optical generator;
a second end of the secondary winding of the transformer being connected to a second input terminal of the pair of input terminals to the optical generator;
the secondary winding of the transformer delivering the differential electrical drive signal to the optical generator;
an impedance element between the secondary winding of the transformer and the optical generator for matching an input impedance to the optical generator;
a current driving circuit for providing a constant current drive signal to the optical generator; and
a second choke positioned between the current driving circuit and the optical generator.

2. The optical transmitter as set forth in claim 1, wherein the optical generator comprises a laser.

3. The optical transmitter as set forth in claim 2, further comprising a thermoelectric cooling circuit for maintaining a desired operating temperature for the laser.

4. The optical transmitter as set forth in claim 1, further comprising an amplifier positioned between the input port and the transformer.

5. The optical transmitter as set forth in claim 1, wherein the input signal comprises a radio frequency signal.

6. An optical communication system, comprising:
an optical transmitter comprising:
a differential drive circuit for receiving an input electrical signal and for generating a differential drive signal;
an optical generator for receiving the differential drive signal and for generating a corresponding optical signal,
a current driving circuit for providing a constant current drive signal to the optical generator;
a choke positioned between the current driving circuit and the optical generator;
wherein the differential drive circuit comprises,
an input port for receiving the input electrical signal;
a transformer having a primary winding and a second winding, the primary winding receiving the input electrical signal from the input port;
a second choke connected to one end of the secondary winding of the transformer and connected directly to a first input terminal of the optical generator;
a second end of the secondary winding of the transformer being connected to a second input terminal of the optical generator;
the secondary winding of the transformer delivering the differential drive signal to the optical generator; and
an impedance element between the secondary winding of the transformer and the optical generator for impedance matching the differential drive circuit to an input impedance to the optical generator; and
an optical receiver comprising:
an optical detector for receiving the optical signal from the optical transmitter and for generating an electrical detected signal;
an amplifier for receiving the detected signal and for generating an amplified signal;
wherein the optical signal from the optical transmitter is transmitted to the optical receiver through an optical transmission medium.

7. The optical communication system as set forth in claim 6, wherein optical generator comprises a laser.

8. The optical communication system as set forth in claim 7, wherein the optical transmitter further comprises:
a thermoelectric cooling circuit for maintaining a desired operating temperature for the laser.

9. The optical communication system as set forth in claim 6, wherein the optical receiver further comprises a transformer having a primary winding connected across an output of the optical detector and a secondary winding connected to the amplifier, wherein the secondary winding of the transformer generates a differential output signal.

10. The optical communication system as set forth in claim 9, wherein the optical detector comprises a photodiode.

11. A radio frequency communication system, comprising:
a device for receiving an input radio frequency signal;
an optical transmitter comprising:
a differential drive circuit for receiving the input radio frequency signal from the device and for generating a differential drive signal; and
an optical generator for receiving the differential drive signal and for generating a corresponding optical signal,
a current driving circuit for providing a constant current drive signal to the optical generator; and
a choke positioned between the current driving circuit and the optical generator;
wherein the differential drive circuit comprises,
an input port for receiving the input radio frequency signal;
a transformer having a primary winding and a second winding, the primary winding receiving the input radio frequency signal from the input port;
a second choice connected to one end of the secondary winding of the transformer and connected directly to a first input terminal of the optical generator;
a second end of the secondary winding of the transformer being connected to a second input terminal of the optical generator;
the secondary winding of the transformer delivering the differential drive signal to the optical generator; and
an impedance element between the secondary winding of the transformer and the optical generator for impedance matching the differential drive circuit to an input impedance to the optical generator; and
an optical receiver comprising:
an optical detector for receiving the optical signal from the optical transmitter and for generating a detected radio frequency signal;
an amplifier for amplifying the detected signal and for generating an output radio frequency signal;
wherein the optical signal from the optical transmitter is transmitted to the optical receiver through an optical transmission medium.

12. The radio frequency communication system as set forth in claim 11, wherein the device comprises an antenna.

13. The radio frequency communication system as set forth in claim 11, further comprising an antenna for receiving the output radio frequency signal.

14. The radio frequency communication system as set forth in claim 11, further comprising the optical transmission medium and wherein the optical transmission medium comprises an optical fiber.

15. The radio frequency communication system as set forth in claim 11, wherein the optical transmitter transmits the optical signals in a first direction along the optical transmission medium to the optical receiver and further comprising a second optical transmitter for transmitting a second set of optical signals to a second optical receiver in a second direction along the optical transmission medium, the second direction being opposite the first direction.

16. The radio frequency communication system as set forth in claim 11, wherein the device receives the input radio frequency signal from a wireless device.

17. The radio frequency communication system as set forth in claim 16, wherein the device receives the input radio frequency signal from a mobile radiotelephone.

* * * * *